(12) United States Patent
Pitkow

(10) Patent No.: US 8,224,711 B2
(45) Date of Patent: *Jul. 17, 2012

(54) METHOD AND APPARATUS FOR CREATING CONTEXTUALIZED AUCTION FEEDS

(75) Inventor: James Edward Pitkow, San Francisco, CA (US)

(73) Assignee: Moreover Acquisition Corporation, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,893

(22) Filed: Oct. 3, 2011

(65) Prior Publication Data

US 2012/0022964 A1    Jan. 26, 2012

Related U.S. Application Data

(63) Continuation of application No. 12/972,204, filed on Dec. 17, 2010, now Pat. No. 8,069,090, which is a continuation of application No. 12/635,455, filed on Dec. 10, 2009, now Pat. No. 7,881,983, which is a continuation of application No. 11/357,813, filed on Feb. 16, 2006, now Pat. No. 7,664,680.

(51) Int. Cl.
*G06Q 30/00* (2006.01)
(52) U.S. Cl. .................. 705/26.3; 705/27.1; 705/37
(58) Field of Classification Search ............. 705/26, 705/27, 37
See application file for complete search history.

(56) References Cited

U.S. PATENT DOCUMENTS

| | | | |
|---|---|---|---|
| 6,122,647 A | 9/2000 | Horowitz et al. | |
| 6,868,525 B1 | 3/2005 | Szabo | |
| 6,892,186 B1 | 5/2005 | Preist | |
| 7,624,065 B2 | 11/2009 | Schoen et al. | |
| 7,664,680 B2 | 2/2010 | Pitkow | |
| 7,881,983 B2 | 2/2011 | Pitkow | |
| 8,069,090 B2 | 11/2011 | Pitkow | |
| 2004/0078316 A1 | 4/2004 | Clark et al. | |
| 2005/0021609 A1 | 1/2005 | Houghton et al. | |
| 2005/0165615 A1 | 7/2005 | Minar | |
| 2005/0172024 A1 | 8/2005 | Cheifot et al. | |
| 2006/0122929 A1 | 6/2006 | Schoen et al. | |
| 2006/0167749 A1 | 7/2006 | Pitkow | |
| 2006/0173985 A1 | 8/2006 | Moore | |
| 2007/0156809 A1 | 7/2007 | Dickinson et al. | |
| 2007/0174340 A1 | 7/2007 | Gross | |
| 2007/0198526 A1 | 8/2007 | Pitkow | |
| 2007/0250428 A1 | 10/2007 | Rabenold et al. | |

FOREIGN PATENT DOCUMENTS

| | | |
|---|---|---|
| WO | 2007/095343 | 8/2007 |
| WO | 2007/098407 | 8/2007 |

OTHER PUBLICATIONS

International Search Report mailed Sep. 20, 2007 for application No. PCT/US2007/004074, 2 pp.
International Search Report mailed Feb. 15, 2008 for application No. PCT/US2007/062317, 3 pp.

(Continued)

*Primary Examiner* — Robert M. Pond
(74) *Attorney, Agent, or Firm* — Holland & Hart LLP

(57) ABSTRACT

A method and apparatus is disclosed herein for generating contextualized live auction feeds. The method of generating contextualized live auction feeds comprises receiving context data from a user. The method further comprises utilizing the context data received from the user to search auctions. The method, in one embodiment, includes generating contextualized live auction feeds for an auction based on the context data.

20 Claims, 7 Drawing Sheets

OTHER PUBLICATIONS

PRN: "Pluck Selects Moreover Technologies . . ." PR Newswire, Sep. 21, 2004, Dialog file 613 #0001338786, 3 pp.

Pluck.com: Internet Archive Wayback Machine, www.archive.org; www.pluck.com; May 2005; 5 pp.

Rupley, Sebastian, "The Never-Ending Search", PC Magazine, Jan. 2005, vol. 24, No. 1, p. 26, Dialog file 16#12641698, 2 pp.

Business Wire: "New Perch" Feature from Pluck Simplifies Shopping on eBay and Amazon.com, Nov. 16, 2004; Proquest #737082131, 3 pp.

UU: Stepno, Bob; "News on Demand; Tired of Browsing . . . ," PC World, Jul. 2004, vol. 22, No. 7, p. 149, Dialog file 148 #0017252069, 9 pp.

http://web.archive.org/web/20040812222649/http://www.thearhitect.co.uk/sch-emas/rss-2.sub.--0.xsd. the architect. XML Schema for RSS v2.0. Jorgen Thelin Jun. 23, 2003.

METHOD AND APPARATUS FOR CREATING CONTEXTUALIZED AUCTION FEEDS

CROSS REFERENCE TO RELATED APPLICATIONS

The present application is a continuation of U.S. patent application Ser. No. 12/972,204, filed Dec. 17, 2010, allowed, which is continuation of U.S. patent application Ser. No. 12/635,455, filed Dec. 10, 2009, now U.S. Pat. No. 7,881,983, which is a continuation of U.S. patent application Ser. No. 11/357,813, filed Feb. 16, 2006, now U.S. Pat. No. 7,664,680, both titled Method and Apparatus for Creating Contextual Auction Feeds, all of which are incorporate herein as if set out in full.

FIELD OF THE INVENTION

The present invention relates to the field of providing feeds; more particularly, the present invention relates to providing a live feed for an auction based on contextualized data received from a user.

BACKGROUND

The internet continues to expand as a source of information gathering, information distribution, and a marketplace for consumer goods. Websites, computer desktops, and other computer applications that were once composed of static or fixed content, now provide live content to readers. Feeds can be incorporated into a user interface, either manually, by software, or through the use of online services, to provide relevant and up-to-date information, in the form of links, short textual excerpts, or a combination of both. Generally, a feed is created based on manual selection, a keyword search of content, constructed rules, or automated algorithms. The result is feed content consisting of a group of links, news headlines, podcasts, weblogs, etc.

A powerful feature of a feed is that it provides relevant data, such as news data, to a person who is a consumer of the content of the feed. The feed generally represents current content. When new content is added to a feed, the old content is removed. Thus, the user sees current information. Because of the ability to provide up-to-date information, feeds are typically incorporated into other content such as web sites, newsletters, weblogs, intranets, applications, kiosks, phones, set top boxes (i.e., cable television), etc. However, one significant limitation of a feed is that the content of the feed is determined in advance.

One attempt to overcome the limitation of predetermined feed content is contextualized advertising. In contextualized advertising, a website may decide to include feeds that provide advertisements to the website, usually in the form of banner ads, pop-ups, advertisement frames, etc. The contextualized advertisement feeds include the ability to analyze the content of a website and provide an advertisement relevant to the content currently being supplied by the website.

A drawback to contextualized advertisements is the possibility of displaying an inappropriate or unwanted advertisement on a website. If a website publishes an article harshly criticizing a major airline, analysis of the content by a contextualized advertisement service may pick up on references to the airline in the article. According to the discussion above, a contextualized advertisement server might then insert an advertisement for that airline into the website. However, supplying an advertisement for the airline to a website criticizing the airline would neither be relevant nor appropriate. The problem described above would be true for any server that is attempting to add contextualized advertisements to a user interface.

Another area of great interest on the internet is in the expansion and growth of internet auctions. An internet auction is generally facilitated by an auction host that provides sellers a marketplace to offer their goods for sale. The auction host also allows buyers to bid on the goods over a predetermined period of time. At the conclusion of the auction, the highest bidder wins, which can result in great financial savings to the buyer. Because of the explosion in popularity of internet auctions, there are currently millions of items for sale on auction hosts. However, because of the staggering number of items for sale in internet auctions, it can be difficult for a potential buyer to locate a specific item. Furthermore, a buyer may not be aware of similar but equally relevant items to an item the user is currently searching for.

Another drawback of the current state of internet auctions is that while the auction is underway, a potential buyer may not be fully apprised of the current state of the auction. Unless the buyer sets up a messaging service or periodically navigates to an auction host, the buyer may miss critical updates to the auction, such as the current bid, how much time is left in an auction, whether a reserve price has been met, etc. These critical pieces of information often determine the outcome of an auction and the success or failure of a potential buyer in winning an auction and acquiring the desired goods.

SUMMARY

A method and apparatus is disclosed herein for generating contextualized auction feeds. The method of generating contextualized auction feeds comprises receiving data from a user. The method further comprises searching available auctions and/or content and providing suggested contextually appropriate feeds for auctions to the user. The method further comprises receiving a selection of one or more feeds from the user. Furthermore, the method includes continually updating the selected live auction feeds so that the user remains appraised of the current status of the selected auction associated with the live auction feed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for generating contextualized live auction feeds in pseudo-real time is described. A user creates data by interacting with the user interlace. An auction feed contextualization tool, then transmits the data to a server through a network. The server generates a contextual live auction feed for one or more auctions based on the data. In one embodiment, the server generates the feeds by using the context data created by the user to search auction hosts. In one embodiment, this search is performed pseudo-real-time, as the context data is being created. The contextualized live auction feeds generated by the server are then transmitted to the user.

The contextualized live auction feeds are displayed in a feed list for the users review. The user, through the user interface, can choose to subscribe, select, restrict, lock, or otherwise manage the live auction feeds as they are generated. Furthermore, as the user continues to produce data, the server continues to generate live auction feeds based on the new data and accumulation of previous data. The feeds generated in response to the accumulated and updated data are transmitted to the user interface. In response to receiving the new feeds based on the updated data, the feed list is updated and displayed to the user.

In one embodiment, the user can then choose to subscribe to a contextualized live auction feed by selecting a feed from the feed list. Upon selection the server will not only continue to suggest contextually appropriate live auction feeds, but the server will also monitor the auction associated with the selected live auction feed for updates. If there is an update to the selected auction, for example a new bid, the server will automatically update the selected live auction feed to reflect updates in the auction.

In one embodiment, feed generation may also be personalized based on past behavioral actions of the user. The user behavioral actions that impact feed generation and/or feed delivery may include generating live auction feeds for frequently searched subject matter, displaying frequently chosen restriction options within the user interface, etc. Furthermore, the user interface may incorporate controls that enable the user to select preferences, disable preferences, enter preferences, etc. One skilled in the art will recognize the numerous options available for personalizing feed generation, selection, and display based on user behavior.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
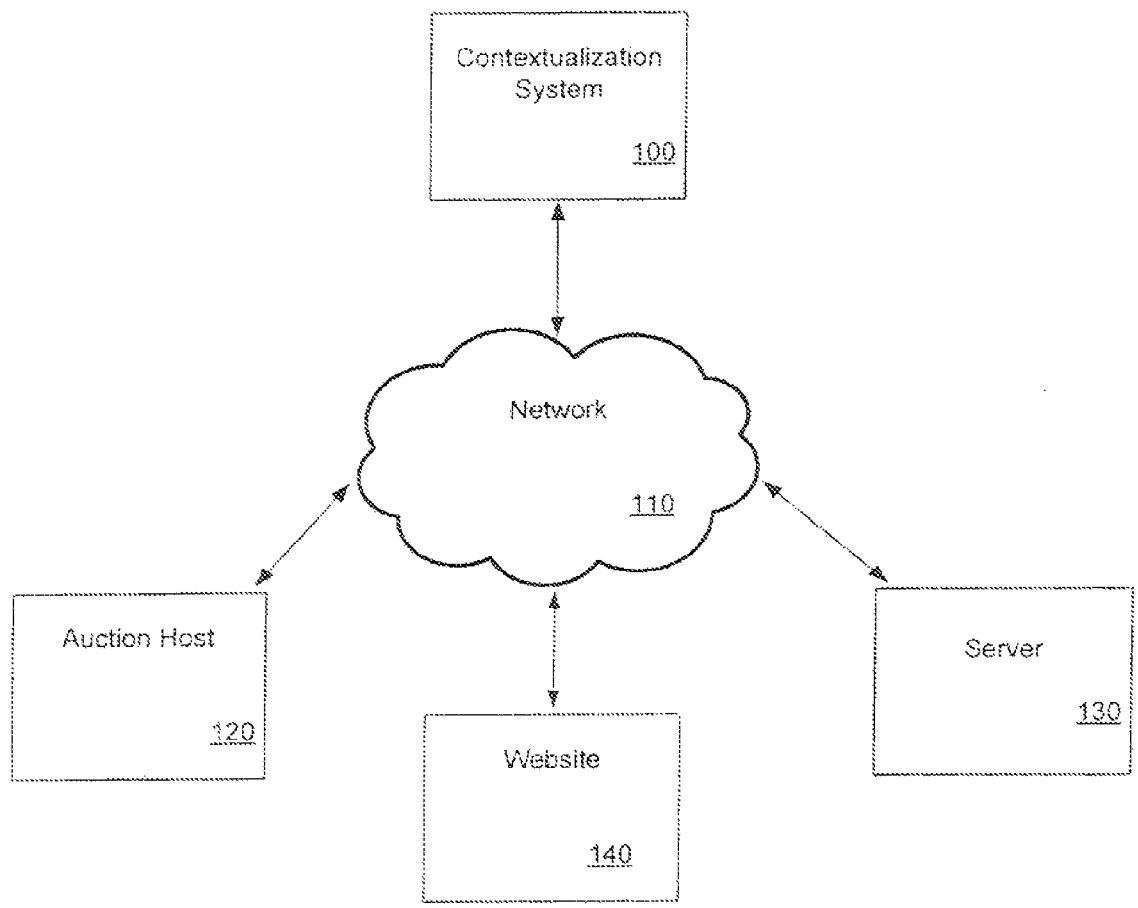
FIG. 1 is a network diagram of one embodiment of a network which may be used to implement the system.

FIG. 1 is a network diagram of one embodiment of a network that may be used to implement the invention, as described below. Contextualization system 100 is coupled to a server 130 via network 140. For one embodiment, network 110 is an insecure network, such as the internet. The contextualization system 100 may be coupled to the network 110 via a modem operating over telephony or cable lines, a digital subscriber line (DSL), a wireless connection, a local area network (LAN), or another type of connection.

Contextualization system 100 may be used to run an application or access a web page. In one embodiment, the application used by contextualization system 100 further includes an interface for data entry. In another embodiment, contextualization system 100 may monitor the interactions of a user with various applications. These interactions, which may range from content creation, content consumption, to other interaction with content are used to create context data, which is used to generate the contextual auction feeds.

The context data is transmitted to the server 130 through the network 110. The context data is then used by the server 130 to create and return live auction feeds to the user, e.g. contextualized live auction feeds. Because the context data is received, used to generate contextualized auction feeds, and then returned by server 130, the user receives contextualized live auction feeds in real-time or pseudo-real time.

In one embodiment, in order for server 130 to create and return live auction feeds, server 130 connects with auction host 120 through network 110. Auction host 120 may be the host of an individual auction, or auction host may host a collection of auctions. Furthermore, server 130 may connect with more than one auction host (not shown) as server 130 can search any number of auction hosts. Server 130 then uses user data to search current auctions of auction host 120. Based upon the current auction of auction host 120 and the user data received from contextualization system 100, server generates contextually appropriate live auction feeds for contextualization system 100. In another embodiment, server 130 may obtain auction data from auction host 120, and store it locally. The server 130 may then use the local auction data for generating contextualized auction feeds.

Upon server 130 receiving a selection of a user to subscribe to a contextualized live auction feed, server 130 will monitor auction host 120 for updates to the auction. Server 130 may monitor the auction host continuously or at discrete intervals so that server 130 can update the live auction feed as updates are monitored. In one embodiment, the update interval may be shortened, as the auction nears its close. In one embodiment, a live auction feed generated by server 130 may consist of at least one static element and at least one dynamic element. Because information, such as auction title, item number, the subject matter of the auction, seller identity, end date, etc. will generally not change over the course of the auction, the server 130 will not update these fields, if they are displayed. Thus, they are referred to as static elements of the live auction feed. However, certain elements of an auction, such as current bid, time remaining, last bid, bid history, seller rating, seller feedback, etc., are subject to change over the course of an auction. Server 130 continuously monitors auction host 120 for updates to these fields and dynamically updates them when an update is monitored. Thus, they are referred to as dynamic elements of the live auction feed. In another embodiment, the live feed only provides a small number of static elements (i.e. auction number, item description) and a small number of live elements current price). In one embodiment, the particular auction elements displayed may be configured by the user. However, in one embodiment, the feed always includes a link to the auction itself.

In one embodiment, an item such as "time remaining" may be set as a static item which is tracked within the feed itself, i.e. without referring to the auction host. Since the time the auction ends is defined, the time remaining can be dynamically calculated within the feed itself.

In one embodiment, the processes and functionality of contextualization system 100 may be embodied in a website 140. Thus, a user who traverses the Internet to website 140, embodying the current invention, may generate context data on the website 140. Then contextualization system 100 would interface with server 130, similar to the discussion above, to generate contextualized live auction feeds based on user data obtained through website 140. In another embodiment, contextualization system 100 may be embodied in a small program, such as a JAVA program, running on the user's computer system, or other device. The program may take context data from user activities regardless of the application which is used.

For one embodiment, the server 130 may reside on the same system as the contextualization system 100 or website 140. As is known in the art, a single device may serve as both a server 130 and a client device, such as contextualization system 100. In that instance, the data being sent from server 130 to contextualization system 100 is not sent via network 110, but rather internally. However, otherwise, the mechanisms described below are not substantively changed.

Figure 2:
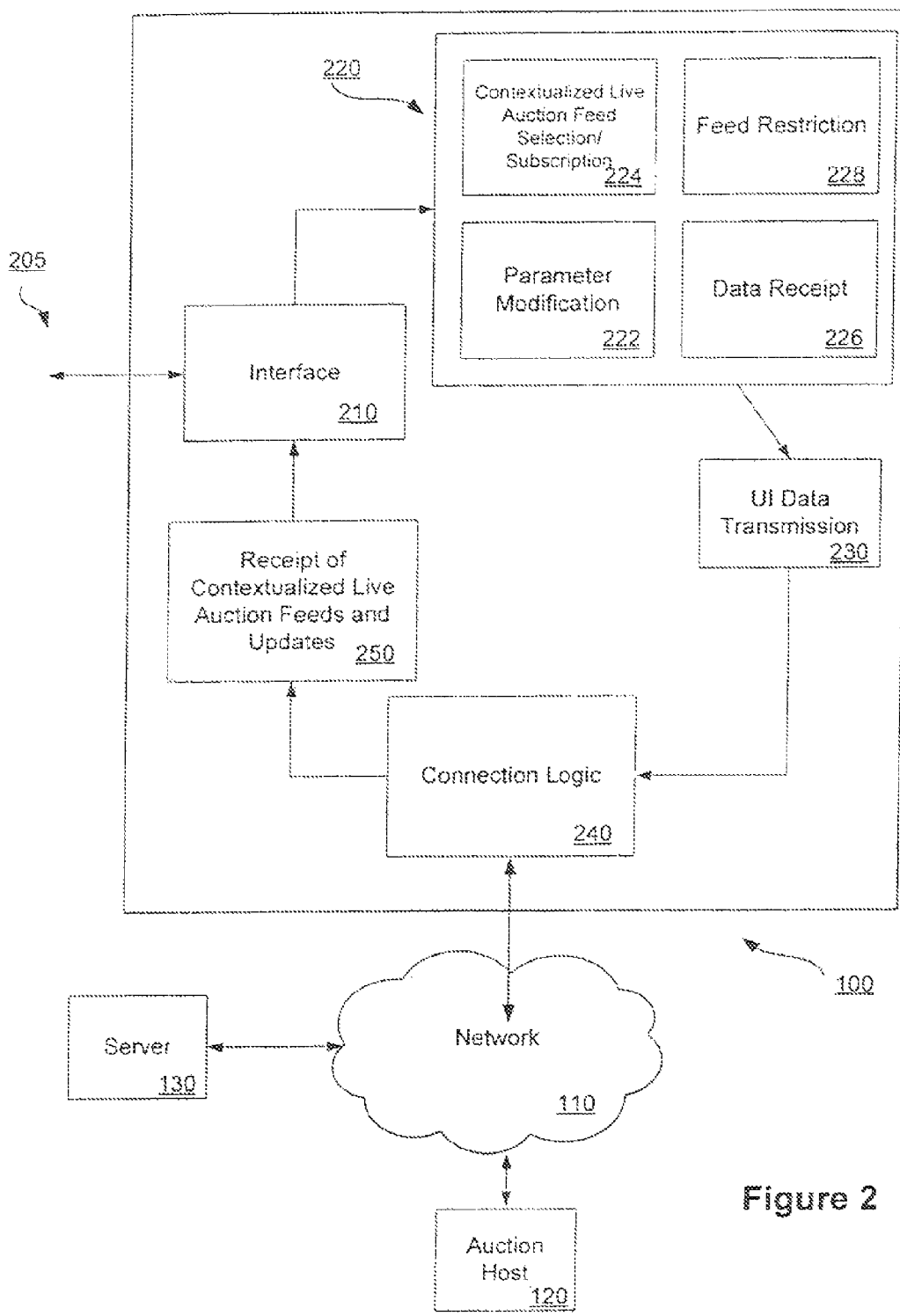
FIG. 2 is a block diagram of a one embodiment of a contextualization system.

FIG. 2 is a block diagram of one embodiment of the contextualization system.

Contextualization system 100 includes user interface 210 for interfacing with a user. In one embodiment, interface 210 performs in-out functions of the user interface so that the user can generate, enter, edit, read and/or otherwise interact with data that is used for contextualization by a server as well as view feeds returned from server 130. In another embodiment, interface 210 monitors the interactions of a user with a computer system, which are transformed by the user interface to data to be contextualized.

Contextualization system 100 receives context data or command entered by the user. Contextualization system 100 can discern between data and commands that can be entered or selected by a user. A user may interact with various applications and data to generate context data. Interactions may include entering, editing, pasting or otherwise creating text or age data, reading or otherwise consuming data, clicking or otherwise selecting data, files or websites, opening documents, opening applications etc. The context data corresponding to the user actions are received 226 by the user interface.

Contextualization system 100 receives data 226, in one embodiment as each interaction is completed. For example, for data entry, each interaction may be completed when each letter is typed, as each word is completed, each sentence, paragraph, or other data unit is finished, etc. In one embodiment contextualization system 100 prepares the context data for transmission over network 110 to server 130. In one embodiment, the context data may be converted into a format suitable for data transmission over a computer network, such as network 110.

The data from contextualization system transmission logic 230 is then provided to connection logic 240 for transmission over network 110. Connection logic 240 may be a modem, Ethernet card, or any other device for coupling contextualization system 100 to network 110. Connection logic 240 then transmits data, comprising the data or change in data, to server 130 so that server 130 can generate contextualized feeds based on the data. The contextualization process of server 130 is described in more detail below.

After server 130 generates live auction feeds based on the context data, the server transmits the live auction feeds through network 110 back to connection logic 240. Thus, contextualized live auction feeds 250 based on the user data are returned to the contextualization system 100. Contextualization system 100 receives the contextualized live auction feeds 250, which can be one or more feeds, and transmits the feeds to interface 210. As discussed above, in one embodiment, each feed transmitted to interface 210 consists of static elements that will not change over the course of an auction, and dynamic elements that can be continuously monitored and dynamically updated by server 130. Interface 210 then displays 205, or otherwise communicates, the suggested contextualized live auction feeds to the user. In one embodiment, only suggested feeds which are selected by the user are dynamically updated. In one embodiment, the information includes controls in addition to the contextualized live auction feeds.

A user, through interface 210, can also issue a command or commands by requesting one or more of the following: feed restriction 228, feed parameter modification 222, or contextualized live auction feed selection/subscription 224. Thus, as data is generated by a user, the user can select one of the suggested contextualized live auction feeds, restrict feed generation by the server, modify the parameters that server 130 uses to generate feeds, etc. In one embodiment, this may be done via controls displayed along with the feeds. In another embodiment, commands may be entered along with the text that performs these functions. Alternative methods of entering commands/signals/indications may be used. In one embodiment, a feed restriction may consist of a restriction such as restricting a feed or selected feeds to a date range, provider, topic, price, seller location etc. In one embodiment, feeds may be restricted by any available metadata. In one embodiment, this metadata includes:

Title
Source
Category
Keyword
Source Category
Seller Rank
Seller Location
Region
Language
Genre
User Interface
Author
Auction Host(s)
Duplicates Filter
Sub, Reg, Prem Sources
Number of Search Results
Relevance vs Date Order
Backscroll
Date Range
Last Article ID
Geolocation Searches
   Location Type
   Region
   Subregion
   Country
   State
   Zip Area
   Zip and Postal Code
   Entity Name Furthermore, the restrictions on feeds may also be used to modify the parameters which the server uses to generate feeds.

Contextualization system 100 transmits data to server 130 as data is being interacted-with by the user. Because the server 130 generates contextualized live auction feeds, and permits controls such as subscribe, restrict, etc. as the data is being created, the process of creating data and associated contextual live auction feeds occurs in real time, or pseudo-real time.

For one embodiment, after the user has selected/subscribed to a contextualized live auction feed 224, server 130 will continuously monitor auction host 120 for updates to the auction associated with the selected feed. Server 130 will dynamically update the selected live auction feed by interfacing with connection logic 240 of the user interface. Contextualization system 100 receives 250 the update(s) to the dynamic elements of the selected live auction feed and transmits the update(s) to interface 210. Interface 210 updates the feed, as it is displayed 205 to user, so that the user is continuously apprised of any updates to the selected auction(s).

Advantageously, the user can select live auction feeds pertaining to an auction of interest to the user. This ensures that inappropriate feeds or unwanted feeds are only displayed temporarily as suggestions, while contextually appropriate feeds are returned to the user. Furthermore, the user can rest assured that critical updates to an auction will not go unnoticed as the live auction feeds are continuously and dynamically updated.

Figure 3:
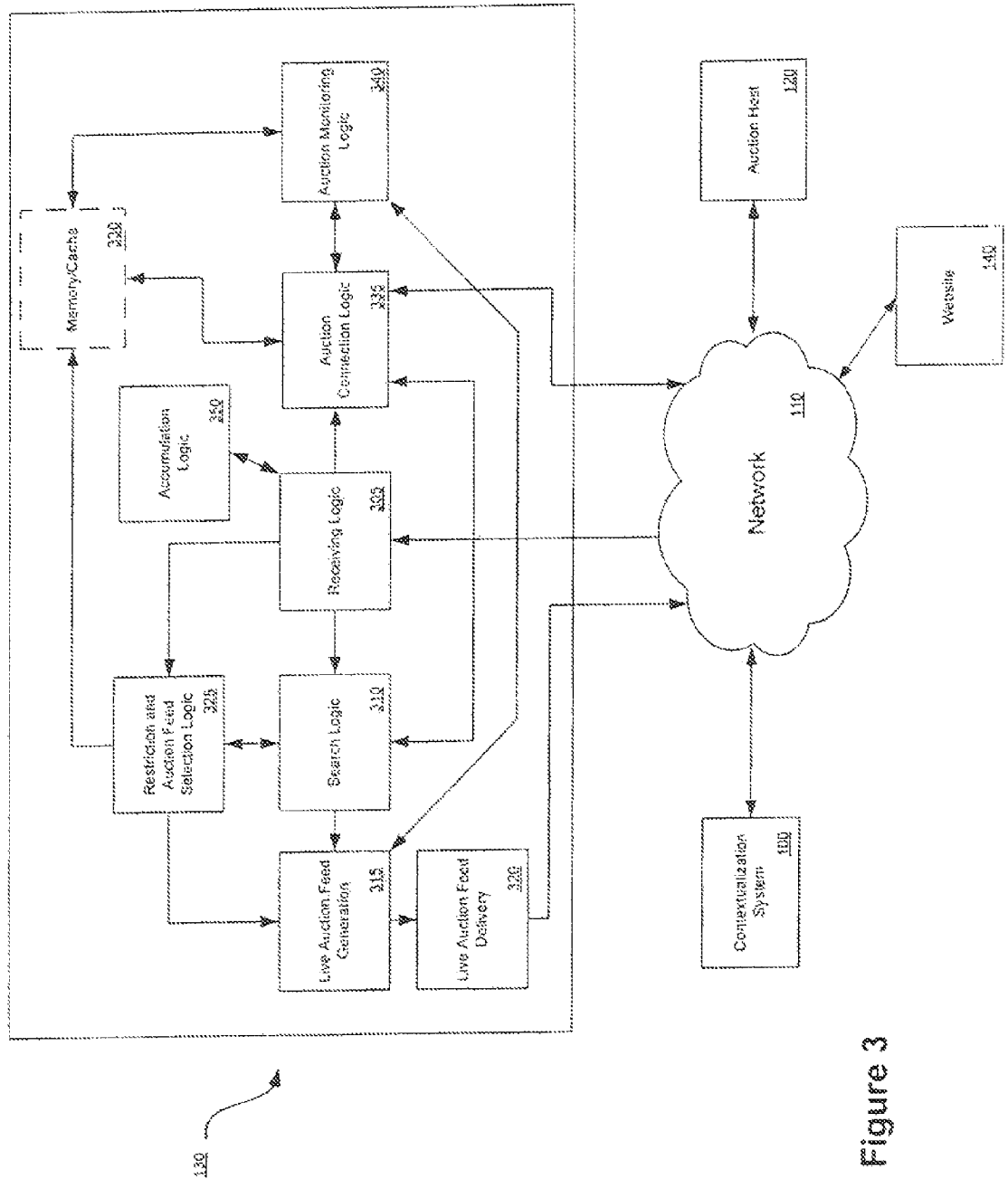
FIG. 3 is a block diagram of one embodiment of the server.

FIG. 3 is a block diagram of one embodiment of the server. Server 130 includes a connection logic (not shown) for coupling server 130 to a network, such as network 110. The connection logic manages communication between server 130 and contextualization system 100, auction host 120, and website 140.

When a user generates context data to be used to generate contextualized feeds by server 130, the data is received by receiving logic 305. In one embodiment, data is received by server 130 in pseudo-real time. Data, as discussed above, can be user interactions monitored by user interface 100, text, image data, sound data, metadata associated with image and sound data, etc. Receiving logic 305 can distinguish between data received from contextualization system 100, and a data received from website 140.

Server 130 receives data from contextualization system 100 in varying data units. In one embodiment, server 130 receives data as each letter is typed by a user. In another embodiment, server 130 receives data as each word, sentence, paragraph, or other data unit is input by a user. In one embodiment, server 130 receives data corresponding to user interactions in various data sizes such as data/application selection, viewed data, search requests, etc.

The data is transferred to search logic 310 as server 130 receives the data. Search logic 310 analyzes the data, so that contextually appropriate live auction feeds may be generated 315 by server 130. In order for search logic to generate contextualized live auction feeds, search logic 310 also gathers data from auction connection logic 335. Auction connection logic interfaces with auction host 120 through network 110 so that auction connection logic can transmit current auction data to search logic 310.

In one embodiment, search logic analyzes current data, accumulated data, and auction data, and the search is based on auction data and the accumulated data received by the server 130. In one embodiment, data is accumulated continuously. In another embodiment, when the user changes tracks, i.e. changes from consuming data to creating data, the past data is discarded and a new accumulation is started. Alternatively, the data may be discarded periodically, when a certain amount of data has been collected, when the user has subscribed to a number of auctions, or on some other basis. In one embodiment, search logic 310 utilizes the context data to search the auction data to generate contextual auctions. Search logic 310 may use a keyword search. Note that context data and auction data may include metadata. In one embodiment, search logic 310 uses a Boolean search. In yet another embodiment, natural language searching may be used. One skilled in the art will recognize that alternative methods of searching may be used.

After the search logic 310 searches the current auctions and user data, live auction feed generation logic 315 generates live auction feeds based on the search of search logic 310. Live auction feed generation may consist of generating a link to a contextually appropriate auction or group of auctions from one website or a collection of websites. In one embodiment, the auction feeds that are available to feed generation logic 315 are pre-analyzed and stored in a database. In one embodiment, these live auction feeds may be generated based on any auction, in addition to internet auctions, which are available to the system.

Live auction feed delivery logic 320 then transmits the live auction feed or list of feeds to contextualization system 100 so that the contextualization system can update a feed list of the live auction feeds received from server 130.

A user may select/subscribe to live auction feeds, restrict generation of feeds, alter factors for feed generation, etc. When such a command is selected, receiving logic 305 receives the command. The command is then handled by restriction and auction feed selection logic 325. When the user selects a live auction feed, restriction and auction feed selection logic 325 has the feed generated 315 and delivered 320 to user interface so that the user will know the feed was successfully selected. Additionally, when a user selects a live auction feed, receiving logic 305 transmits the selection to auction connection logic 335 so that auction connection logic can store the selection in memory 330. Further, auction connection logic transmits the selection to auction monitoring logic 340 so that auction monitoring logic 340 can continuously monitor the selected live auction feed.

In one embodiment, contextualization system 100 can be used to define criteria and/or preferences that effect how search logic searches for feeds. In one embodiment, the criteria may include one or more of data, data range, source, geographic location, etc. An exemplary listing of such factors is discussed above. As such, search logic can be used to fine-tune feed generation according to a user's preferences. In one embodiment, these preferences may be set on a case-by-case basis. In another embodiment, these preferences may be entered once, and applied globally or to a subset of entries, based on the user's preferences.

Contextualization system 100 may also be used to select live auction feed from the user's feed list. In one embodiment, restriction and feed selection logic 325 stores the selection in a memory 330. Thus, the live auction feed selection can later be recalled from memory 330 by a user. Furthermore, the restrictions are stored as well. Thus, the restrictions can later be recalled from memory 330 so that server can generate a live auction feed list based on the stored previous feed restrictions associated with a user. In one embodiment, memory 330 is a cache memory within server 130. In another embodiment, memory 330 is an external memory coupled to server 130. In this case, the external memory could be a cache memory, database, or any other apparatus capable of storing feeds or feed restrictions. The varying embodiments of memory 330 are denoted by the dashed lines representing the memory of FIG. 3.

After the user has made a feed selection, auction monitoring logic 340 will continuously monitor the selected auction for updates. In one embodiment, in order to monitor an auction, auction monitoring logic 340 interfaces with auction connection logic 335 which gathers information from auction host 120. Thus, when auction monitoring logic 340 determines that a relevant change has occurred to an auction, auction monitoring logic 340 transmits the update to live auction feed generation logic 315. In one embodiment, relevant changes are changes to those auction elements which are displayed in the live auction feed for the user. Live auction feed generation logic 315 generates an updated feed and forwards the update to live auction feed delivery logic 320. The updated contextualized live auction feed is then transmitted to contextualization system 100 through network 110 so that the update may be displayed to the user in the feed list of the contextualization system 100.

Figure 4:
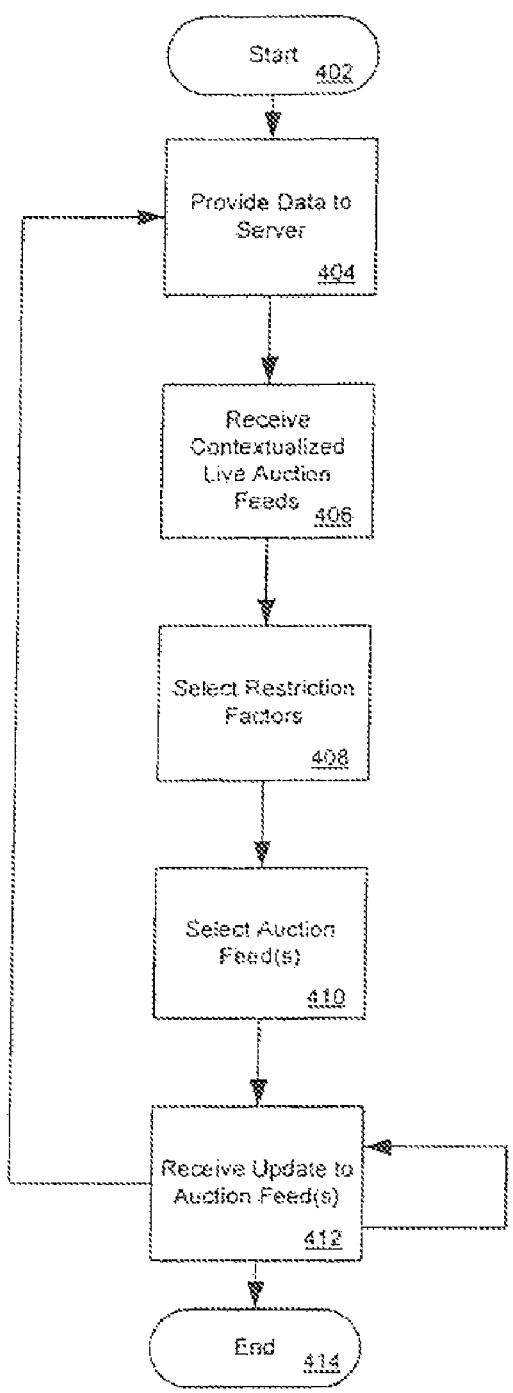
FIG. 4 is a flowchart of one embodiment of a user utilizing the live auction feeds.

FIG. 4 is a flow diagram illustrating one embodiment of a method for generating contextualized feeds. The process is performed by processing logic that may comprise hardware (circuitry, dedicated logic, etc.), software (such as is run on a general purpose computer system or a dedicated machine), or a combination of both. The process starts at block 402 when a user begins interacting with his or her system in a manner that will produce context data. This interaction may include entering or creating data, editing data, reading or otherwise consuming data, clicking on data, opening applications, etc. In one embodiment, the process starts when the contextualization system creates context data.

Data from the contextualization system is transmitted to the server through a network, where the server receives the content 404. In one embodiment this occurs on a word-by-word basis. In another embodiment, this occurs on a character-by-character basis. In another embodiment, this occurs at the end of each sentence or paragraph. In another embodiment, this occurs after each logical user interaction or group of interactions with a computer system. Alternative pseudo-real-time segments may be created.

After the server has utilized the context data to search auction data gathered form auction hosts, the server returns contextualized live auction feeds to the user interface 406. The live auction feeds are used to populate a feed list of the contextualization system.

As discussed above, included in either the contextualization system are restriction factors that affect how a server generates live auction feeds and/or how live auction feeds are displayed by the interface. A user can select one or more restriction factors 408. However, a user is not required to select any restriction factors as the server will continue to generate contextualized live auction feeds upon receiving context data.

A user may select a live auction feed 410 from the feed list of the user interface. In one embodiment, a user can select a group of feeds. By selecting a contextualized live auction feed, the user will continuously receive updates to the selected live auction feed 412 as a server monitors updates to an auction corresponding to the selected live auction feed. The server will monitor the auction associated with the selected contextualized live auction until either the auction ends, or the user deselects the live auction feed.

While the selected live auction feed(s) are continuously monitored by server 130, a user may also continue to generate context data. When a user generates additional context data, the feed list is updated by repeating processing blocks 404-412. Although the suggested feed list changes in response to new user data, the previously selected live auction feeds will continue to be displayed to the user.

Figure 5:
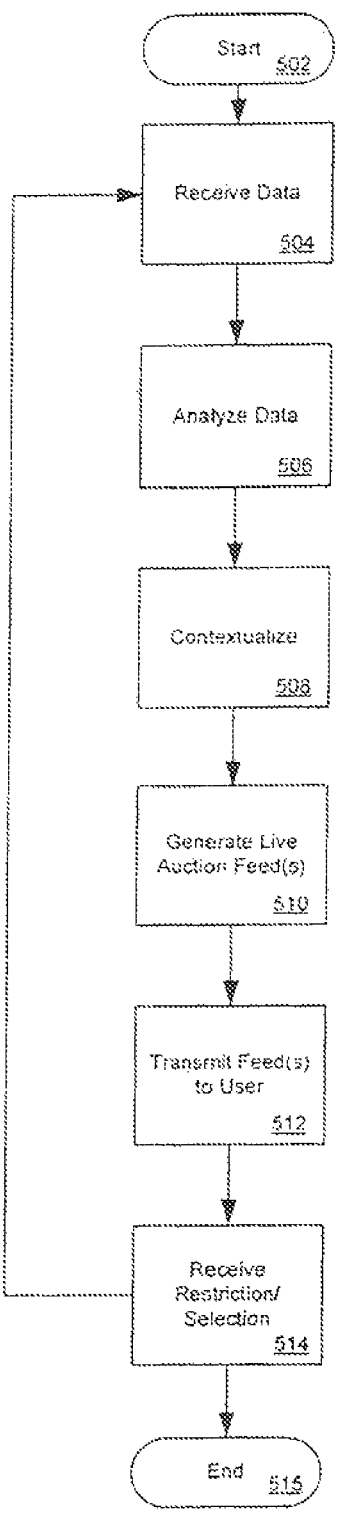
FIG. 5 is a flowchart of one embodiment of a server contextualizing user data to generate live auction feeds.

FIG. 5 is a flowchart of one embodiment of a server generating contextualized live auction feeds. The process is performed by processing logic that may comprise hardware (circuitry, dedicated logic, etc.), software (such as is run on a general purpose computer system or a dedicated machine), or a combination of both. The process starts at block 502 when a server, such as server 130, communicates with a user interface.

A user enters or creates context data collected by contextualization system 100, which is transmitted and received by a server 504. As discussed above, data is received in various units, such as by word, sentence, interaction, etc.

If the server has received data 504 for the first time, the server will use the context data by searching auction data. The search may be a word search, Boolean search, natural language search, or some other method for searching the data along with auction data. However, if the server has previously received data, the server will analyze the newly received data with the previously received data, i.e., accumulated data. In either case, from the analysis the proposed feed data is generated 508.

Server 130 then generates live auction feed(s) 510 that are contextually appropriate to the data received by the server. As discussed above, the server will generate contextualized live auction feeds 510 that contain both static elements and dynamic elements.

The contextualized live auction feed(s) are then transmitted to a user 512 so that the live auction feeds can be displayed in a user interface, such as contextualization system 100. The transmitted feeds either populate the user's live auction feed list or update the user's live auction feed list.

After a user has received contextualized live auction feeds, the user can select feeds from the user interface feed list. A user may also select restrictions as to how feeds are to be generated by a server or on how the feeds are to be displayed. The server receives the restriction and/or feed selection 514. If the user has selected to restrict feed creation and/or display, the selection and/or restriction effects future iterations of processing blocks 504-514. However, if a user selects, or subscribes, to a live auction feed, this selection is used to inform the server to monitor the auction corresponding to the selected live auction feed, as discussed in FIG. 6. In both cases, the process of feed generation ends 515 when the user discontinues entering new data.

Figure 6:
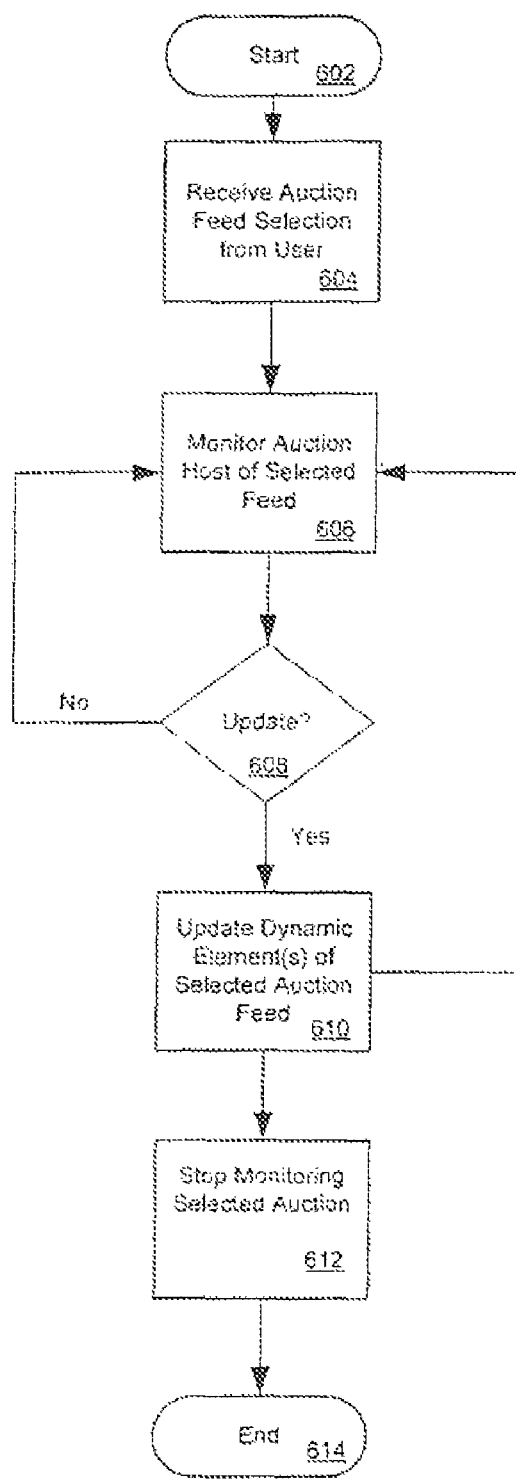
FIG. 6 is a flowchart of one embodiment of a server updating selected live auction feeds.

FIG. 6 is a flowchart of one embodiment of a server monitoring a selected contextualized live auction feed. The process is performed by processing logic that may comprise hardware (circuitry, dedicated logic, etc.), software (such as is run on a general purpose computer system or a dedicated machine), or a combination of both. The process starts at block 602 when a server is interfacing with a user interface that has received contextualized live auction feeds.

Upon the user making a selection of a contextualized live auction feed to be monitored by the server, the request is transmitted to, and received by, a server 604.

After receiving the selection of the user, the server will continuously monitor the auction host associated with the contextualized live auction feed 606. At processing block 608, the server monitors an auction host for any updates that will affect the selected contextualized live auction feed. As discussed above, auction elements to be monitored by the server may include any of current bid, time remaining, last bid, bid history, seller rating, seller feedback, etc. In one embodiment, only those auction elements associated with dynamic display elements of the selected auction feed are monitored.

If there are no updates monitored by the server, the process returns to processing block 606 so that the server continues to monitor the auction. When there are updates to the auction, the server will update the dynamic element(s) of the selected auction feed 610 and then continue to monitor the auction host of the selected feed 606.

However, the update(s) may also indicate to the server that the server can stop monitoring the selected auction 612. This may occur naturally when the auction ends. The server may also stop monitoring an auction when the auction is de-selected by the user. After the server stops monitoring the auction, the process ends at processing block 614.

Figure 7:
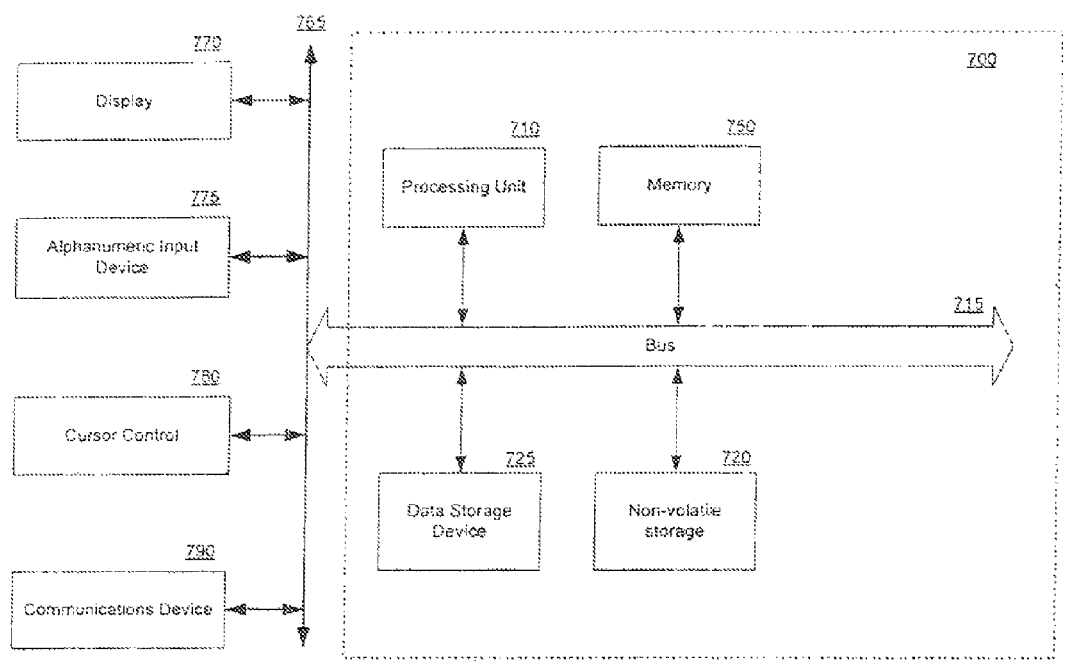
FIG. 7 is a block diagram of one embodiment of a computer system which may be used with the present invention.

FIG. 7 is one embodiment of a computer system on which the present invention may be implemented. It will be apparent to those of ordinary skill in the art, however, that other alternative systems of various system architectures may also be used.

The data processing system illustrated in FIG. 7 includes a bus or other internal communication means 765 for communicating information, and a processor 760 coupled to the bus 765 for processing information. The system further comprises a random access memory (RAM) or other volatile storage device 750 (referred to as memory), coupled to bus 765 for storing information and instructions to be executed by processor 760. Main memory 750 also may be used for storing temporary variables or other intermediate information during execution of instructions by processor 760. The system also comprises a read only memory (ROM) and/or static storage device 720 coupled to bus 765 for storing static information and instructions for processor 760, and a data storage device 725 such as a magnetic disk or optical disk and its corresponding disk drive. Data storage device 725 is coupled to bus 765 for storing information and instructions.

The system may further be coupled to a display device 770, such as a cathode ray tube (CRT) or a liquid crystal display (LCD) coupled to bus 765 through bus 765 for displaying information to a computer user. An alphanumeric input device 775, including alphanumeric and other keys, may also be coupled to bus 765 through bus 765 for communicating information and command selections to processor 760. An additional user input device is cursor control device 780, such as a mouse, a trackball, stylus, or cursor direction keys coupled to bus 765 through bus 765 for communicating direction information and command selections to processor 760, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 760.

It will be apparent to those of ordinary skill in the art that the system, method, and process described herein can be implemented as software stored in main memory 750 or read only memory 720 and executed by processor 760. This control logic or software may also be resident on an article of manufacture comprising a computer readable medium having computer readable program code embodied therein and being readable by the mass storage device 725 and for causing the processor 760 to operate in accordance with the methods and teachings herein.

The present invention may also be embodied in a handheld or portable device containing a subset of the computer hardware components described above. For example, the handheld device may be configured to contain only the bus 765, the processor 760, and memory 750 and/or 725. The handheld device may also be configured to include a set of buttons or input signaling components with which a user may select from of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 760, a data storage device 725, a bus 765, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 760. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method for managing live action feeds over networked computers, the method comprising:
    receiving data at a server from that comprises non-command data entered by a user at a user interface as the user generates the data;
    generating context data as the data is received at the server by determining whether the data was at least one of entered, edited, pasted or consumed by the user at the user interface;
    using the context data to create at the server a list containing at least one contextually appropriate live auction feed based on the context data;
    transmitting from the server to the user interface the list containing at least one contextually appropriate live auction feed along with a request for the user to manage the at least one contextually appropriate live auction feeds;
    receiving at the server from the user interface information to manage the at least one contextually appropriate live auction feeds to manage the contextually appropriate live auction feeds;
    transmitting to the user interface each of the managed contextually appropriate live auction feeds;
    for each of the managed contextually appropriate live auction feeds, monitoring the managed contextually appropriate live auction feeds at a predetermined interval for modifications to the selected contextually appropriate live auction feeds; and updating the managed contextually appropriate live auction feeds with the modification.

2. The method of claim 1 wherein the user generates data at the completion of each alpha-numeric entry.

3. The method of claim 1, wherein the selected contextually appropriate live auction feeds comprises at least one dynamic element to be monitored.

4. The method of claim 3, wherein the at least one dynamic element is selected from a group of dynamic elements consisting of: current bid, time remaining in auction, last bid, bid history, seller rating, or seller feedback.

5. The method of claim 4, wherein the at least one dynamic element is the time remaining in auction and comprising varying the predetermined interval inversely with the time remaining in auction.

6. The method of claim 1, wherein updates to the contextually appropriate live auction feeds are streamed from an auction host.

7. The method of claim 1, wherein the predetermined interval is continuously.

8. The method of claim wherein updating the managed contextually appropriate live auction feed comprises updating a bid price.

9. An article of manufacture including one or more non-transitory computer-readable media that contain a program of instructions that when executed by one or more processors in the processing system, causes the one or more processors to perform a method of providing auction information to a user, the programming instructions comprising:

receiving data at a server from that comprises non-command data entered by a user at a user interface as the user generates the data;

generating context data as the data is received at the server by determining whether the data was at least one of entered, edited, pasted or consumed by the user at the user interface;

using the context data to create at the server a list containing at least one contextually appropriate live auction feed based on the context data;

transmitting from the server to the user interface the list containing at least one contextually appropriate live auction feed along with a request for the user to manage the at least one contextually appropriate live auction feeds;

receiving at the server from the user interface information to manage the at least one contextually appropriate live auction feeds to manage the contextually appropriate live auction feeds;

transmitting to the user interface each of the managed contextually appropriate live auction feeds;

for each of the managed contextually appropriate live auction feeds, monitoring the managed contextually appropriate live auction feeds at a predetermined interval for modifications to the selected contextually appropriate live auction feeds; and updating the managed contextually appropriate live auction feeds with the modification.

10. The article of manufacture of claim 9, wherein the user generates data at the completion of each alpha-numeric entry.

11. The article of manufacture of claim 9, wherein the selected contextually appropriate live auction feeds comprises at least one dynamic element to be monitored.

12. The article of manufacture of claim 11, wherein the at least one dynamic element is selected from a group of dynamic elements consisting of: current bid, time remaining in auction, last bid, bid history, seller rating, or seller feedback.

13. The article of manufacture of claim 12, wherein the at least one dynamic element is the time remaining in auction and comprising varying the predetermined interval inversely with the time remaining in auction.

14. The article of manufacture of claim 9, wherein the predetermined interval is continuous.

15. An apparatus for generating contextualized auction feeds, the apparatus comprising:

a processor and associated computer-readable media that contain a program of instructions which causes the processor to receive at least one unit of non-command data created from a data interaction between a user and a user interface from the user interface regarding an auction;

generate at least one context data from the at least one unit of non-command data to search a plurality of auction hosts to identify at least one contextually appropriate live auction feed;

creating a feed for each at least one contextually appropriate live auction feeds, wherein each feed is a contextualized auction feed;

provide the contextualized auction feeds as part of an electronic feed list to the user interlace along with a request for the user to manage each of the at least one contextually appropriate live auction feeds;

receive, from the user interface, information to manage each of the contextualized auction feeds; and monitor the selected contextualized auction feed at predetermined intervals for modifications to fields associated the at least one contextually appropriate live auction feed and automatically update the selected contextualized auction feed when a modification is detected.

16. The apparatus of claim 15, wherein a data interaction comprises completion of each alpha-numeric entry.

17. The apparatus of claim 15, wherein the selected contextually appropriate live auction feeds comprises at least one dynamic element to be monitored.

18. The apparatus of claim 17, wherein the at least one dynamic element is selected from a group of dynamic elements consisting of: current bid, time remaining in auction, last bid, bid history, seller rating, or seller feedback.

19. The apparatus of claim 18, wherein the at least one dynamic element is the time remaining in auction and comprising varying the predetermined interval inversely with the time remaining in auction.

20. The apparatus of claim 15, wherein the predetermined interval is continuous.

* * * * *